(12) United States Patent
Diamantopoulos et al.

(10) Patent No.: US 11,630,696 B2
(45) Date of Patent: Apr. 18, 2023

(54) MESSAGING FOR A HARDWARE ACCELERATION SYSTEM

(71) Applicant: International Business Machines Corporation, Armonk, NY (US)

(72) Inventors: Dionysios Diamantopoulos, Thalwil (CH); Mitra Purandare, Zurich (CH); Burkhard Ringlein, Zürich (CH); Christoph Hagleitner, Wallisellen (CH)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 16/833,755

(22) Filed: Mar. 30, 2020

(65) Prior Publication Data

US 2021/0303352 A1 Sep. 30, 2021

(51) Int. Cl.
*G06F 9/50* (2006.01)
*G06F 9/30* (2018.01)
*G06F 9/445* (2018.01)
*G06F 9/54* (2006.01)

(52) U.S. Cl.
CPC ........ *G06F 9/5011* (2013.01); *G06F 9/30087* (2013.01); *G06F 9/44536* (2013.01); *G06F 9/546* (2013.01)

(58) Field of Classification Search
CPC .............. G06F 9/5011; G06F 9/30087; G06F 9/44536; G06F 9/546
See application file for complete search history.

(56) References Cited

U.S. PATENT DOCUMENTS

| | | | |
|---|---|---|---|
| 7,363,260 B1 * | 4/2008 | Stamler | G06Q 10/087 705/28 |
| 7,584,345 B2 | 9/2009 | Doering | |
| 7,941,777 B1 | 5/2011 | Young et al. | |
| 10,171,169 B2 | 1/2019 | Frankel et al. | |

(Continued)

FOREIGN PATENT DOCUMENTS

WO  2016168033 A1  10/2016

OTHER PUBLICATIONS

Canziani et al., "An Analysis of Deep Neural Network Models for Practical Applications", Apr. 14, 2017, 7 pages.

(Continued)

*Primary Examiner* — Emerson C Puente
*Assistant Examiner* — Jonathan R Labud
(74) *Attorney, Agent, or Firm* — Donald J. O'Brien

(57) ABSTRACT

The present disclosure relates to a messaging method for a hardware acceleration system. The method includes determining exchange message types to be exchanged with a hardware accelerator in accordance with an application performed by the hardware acceleration system. The exchange message types indicate a number of variables, and a type of the variables, of the messages. The method also includes selecting schemas from a schema database. The message type schemas indicates a precision representation of variables of messages associated with the schema. The selected schemas correspond to the determined exchange message types. Further, the method includes configuring a serial interface of the hardware accelerator in accordance with the selected schemas, to enable a message exchange including the messages.

19 Claims, 4 Drawing Sheets

(56) References Cited

U.S. PATENT DOCUMENTS

| | | | |
|---|---|---|---|
| 10,275,558 B2 | 4/2019 | Tamir | |
| 10,833,955 B2 | 11/2020 | Isci | |
| 11,360,789 B2 | 6/2022 | Ringlein | |
| 2002/0141449 A1* | 10/2002 | Johnson | G06F 9/546 370/473 |
| 2006/0242649 A1* | 10/2006 | Gurevich | G06F 9/546 719/315 |
| 2007/0153681 A1* | 7/2007 | Steeb | H04L 43/18 370/412 |
| 2007/0156549 A1* | 7/2007 | Tran | G06Q 10/00 705/35 |
| 2015/0193233 A1* | 7/2015 | Eberle | G06F 9/3016 712/210 |
| 2016/0202999 A1 | 7/2016 | Van Den Heuvel | |
| 2017/0123394 A1 | 5/2017 | Oliverio et al. | |
| 2018/0129770 A1 | 5/2018 | Tamir | |
| 2019/0155669 A1 | 5/2019 | Chiou | |
| 2019/0187718 A1* | 6/2019 | Zou | G06T 5/20 |
| 2019/0190847 A1 | 6/2019 | Burger et al. | |
| 2020/0257566 A1 | 8/2020 | Ganguli | |
| 2021/0081432 A1 | 3/2021 | Grunwald | |
| 2021/0182052 A1 | 6/2021 | Li | |
| 2021/0399954 A1 | 12/2021 | Dabell | |

OTHER PUBLICATIONS

Sze et al., "Efficient Processing of Deep Neural Networks: A Tutorial and Survey", Aug. 13, 2017, 32 pages.

Diamantopoulos et al., "A System-level Transprevcision FPGS Accelerator for BLSTM with On-Chip Memory Reshaping", 2018 International Conference on Field-Programmable Technology (FPT), Dec. 10-14, 2018, 4 pages.

Xu et al., "Scaling for edge inference of deep neural networks", nature electronics, Apr. 2018, 8 pages.

Zhang et al., "HGum: Messaging Framework for Hardware Accelerators", Jan. 19, 2018, 8 pages.

Samragh et al., "CodeX: Bit-Flexible Encoding for Streaming-based FPGA Acceleration of DNNs", Jan. 17, 2019, 9 pages.

Koeplinger et al., "Spatial: A Language and Compiler for Application Accelerators", PLDI'18, Jun. 18-22, 2018, 16 pages.

"Compute, Storage, and Networking Extensions", Downloaded Jan. 5, 2022, 10 Pgs. <https://kubernetes.io/docs/concepts/extend-kubernetes/compute-storage-net/device-plugins/>.

Amazon Web Services to Launch Its Own Public Container Registry, Downloaded Jan. 5, 2022, 2 Pgs. <https://www.techzine.eu/news/devops/51682/amazon-web-services-to-launch-its-own-public-container-registry/>.

Burkhard Ringlein et al., "Configuration of Hardware Devices", P201910338US01, U.S. Appl. No. 16/921,539, filed Jul. 6, 2020.

Diamantopoulos et al., "Optimizing Container Executions With Network-Attached Hardware Components of a Composable Disaggregated Infrastructure", U.S. Appl. No. 17/648,573, filed Jan. 21, 2022, 28 pages.

Github, "AWS Shell Interface Specification," https://github.com/aws/aws-fpga/blob/master/hdk/docs/AWS_Shell_Interface_Specification.md#ShellInterfaces, printed May 7, 2020, 21 pgs.

Github, "IBM CAPI SNAP framework, Version 1.0, How is data managed in the SNAP environment?," https://github.com/openpower/snap/blob/master/doc/AN_CAPI_SNAP-How_is_data_managed,pdf, printed May 7, 2020, 3 pgs.

IBM Appendix P., "List of IBM Patents or Patent Applications to be Treated as Related", Dated Herewith, 2 pages.

Jones; "Reducing Your Docker Image Size", Downloaded May 6, 2021, 6 Pgs., <https://www.cloudbees.com/blog/reduce-docket-image-size/>.

Mell et al., "The NIST Definition of Cloud Computing," Recommendations of the National Institute of Standards and Technology, U.S. Department of Commerce, Special Publication 800-145, Sep. 2011, 7 pgs.

Putnam, et al., "A Reconfigurable Fabric for Accelerating Large-Scale Datacenter Services," https://www.microsoft.com/en-us/research/wp-content/uploads/2016/02/Catapult_ISCA_2014.pdf, © 2014 IEEE, 12 pgs.

Ringlein et al., "Configuration of Hardware Devices", U.S. Appl. No. 16/921,539, filed Jul. 6, 2020, 41 Pgs.

Ringlein et al., "System architecture for network-attached FPGAs in the Cloud using partial reconfiguration," IEEE: DOI 10.1109/FPL.2019.00054, © 2019 IEEE, 8 pgs.

Roozbeh et al;, "Software-Defined "Hardware" Infrastructures: A Survey on Enabling Technologies and Open Research Directions", 2018, 34 Pgs, <https://doi.org/10.1109/COMST.2018.2834731>.

Shantharama et al.;, "Hardware Acceleration for Container Migration on Resource-Constrained Platforms", IEEE Access, Sep. 18, 2020, vol. 8, 2020, 16 Pgs, <https://creativecommons.org/licenses/by4.0/>.

Tarafdar et al., "Building the Infrastructure for Deploying FPGAs in the Cloud," https://www.researchgate.net/publication/327162335, Jan. 2019, 27 pgs.

Understanding Disaggregated Compute and Storage for Kubernetes, Oct. 5, 2020, 9 Pgs, <https://portworx.com/understanding-disaggregated-compute-and-storage-for-kubernetes/>.

Unknown, "Express routing," https://expressjs.com/en/guide/routing.html, printed May 7, 2020, 6 pgs.

Weerasinghe; "Standalone Disaggregated Reconfigurable Computing Platforms in Cloud Data Centers", Technische Universität Munchen, May 2018, 182 Pgs.

Xilinix, "Data Center Acceleration," https://www.xilinx.com/applications/data-center.html, printed May 7, 2020, 6 pgs.

* cited by examiner

MESSAGING FOR A HARDWARE ACCELERATION SYSTEM

BACKGROUND

The present disclosure relates to the field of digital computer systems, and more specifically, to a method for a hardware acceleration system.

Hardware acceleration enables the use of a computer hardware made to perform some functions more efficiently than is possible in software running on a general-purpose central processing unit (CPU). Computer hardware can, for example, comprise a graphics processing unit (GPU), a field-programmable gate array (FPGA), or an application-specific integrated circuit (ASICs). The FPGA is an integrated circuit designed to be configured in order to perform some functions. The FPGA configuration is generally specified using a hardware description language (HDL). FPGAs contain an array of programmable logic blocks, memory blocks, and a hierarchy of reconfigurable interconnects that allow the blocks to be wired together. Logic blocks can be configured to perform complex combinational functions.

SUMMARY

The present disclosure relates to a messaging method for a hardware acceleration system. The method includes determining exchange message types to be exchanged with a hardware accelerator in accordance with an application performed by the hardware acceleration system. The exchange message types indicate a number of variables, and a type of the variables, of the messages. The method also includes selecting schemas from a schema database. The message type schemas indicates a precision representation of variables of messages associated with the schema. The selected schemas correspond to the determined exchange message types. Further, the method includes configuring a serial interface of the hardware accelerator in accordance with the selected schemas, to enable a message exchange including the messages.

In another aspect, the present disclosure relates to a computer program product comprising a computer-readable storage medium having computer-readable program code embodied therewith, the computer-readable program code configured to implement the method.

In another aspect, the present disclosure relates to a system comprising a memory and a processor that executes instructions stored in the memory to implement the method.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
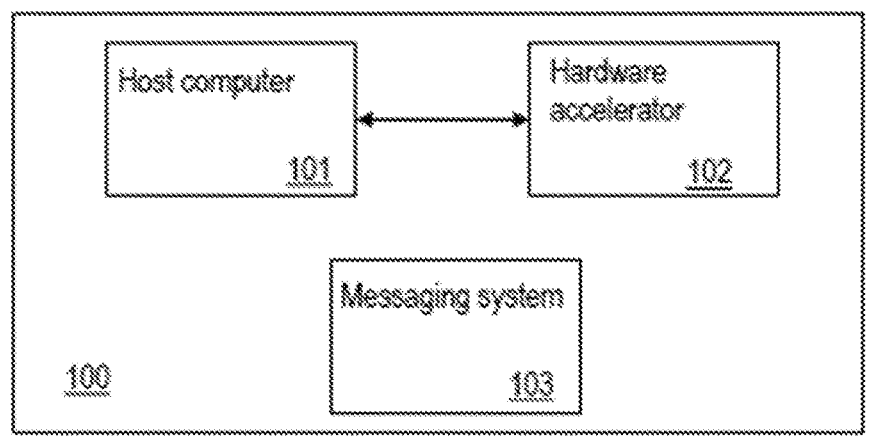
FIG. 1 is a block diagram of a hardware acceleration system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The hardware acceleration system can be configured to perform or implement the application. The application can, for example, be a training or inference of a neural network. The execution of the application by the hardware acceleration system can involve the exchange of messages between the hardware accelerator and other components, such as processing units, of the hardware acceleration system. A message can comprise variables and their definition. For example, a message can have a message type (or schema) that indicates the number of variables, their order and/or types of variables used in the message. For example, a message can comprise two variables A and B. A first message type can indicate that A is followed by B, that A is an int32 and B is a float, while a second message type can indicate that B is followed by A, that A is an int16 and B is a float etc. However, those message types can be adapted or refined over time. That is, an initial definition of the messages can be adapted for several reasons. For that, the present disclosure can enable to define alternative schemas for the messages so that they can be adapted in time, and in a systematic way. This can enable a flexible implementation of the application by the hardware acceleration system. Following the above example, the schema database can provide one or more other schemas in association with each of the first and second message type. For example, the schema database can comprise in association with the first message type a schema that changes the precision of the variables A and B e.g. the schema can indicate that A is an int64 and B is a double.

The serial interface can be enabled to send and receive data at the hardware accelerator. The serial interface enables the serialization of the data for transmitting and the deserialization of data received from outside of the hardware accelerator (for use inside the hardware accelerator). The serialization and the deserialization can depend on the schema of the messages being exchanged. For that, the present techniques can configure the serial interface in accordance with the selected schemas by, for example, generating serialization and deserialization functions or routines that are adapted to the selected schemas. The present disclosure can thus provide a messaging framework to handle messages both between a software and hardware accelerator and between different hardware accelerators of the hardware acceleration system. The framework can support large messages with relatively complex schemas while meeting constraints such as clock frequency, area, and throughput. The framework can generate relatively high performance and low-cost hardware logics by employing a design that algorithmically parses the selected schemas to perform serialization and deserialization.

The hardware accelerator can comprise more than one serial interface, wherein each serial interface is configured to process a respective group of message types. For example, each message type of the group of message types can be used by a portion of the hardware accelerator for evaluating a weighting function, while each message type of another group of message types can be used by another portion of the hardware accelerator for performing another operation. Thus, for each selected schema, a corresponding serial interface can be configured. In another example, a single serial interface can be used, wherein each group of message types can be associated with a respective serializer-deserializer pair that is configured when a schema is selected/mapped to one of the message types of the group.

In one example, the messages to be exchanged during an execution of the application can be specified or described in the same format such as, an interface definition language (IDL) format. Providing a unified format of messages can facilitate the data exchange in the hardware acceleration system. This can be advantageous as the different components of the hardware acceleration system can use different programing languages which can result in sparse message formats. In another example, the messages can be provided in any of numerous other formats. In this way, embodiments of the present disclosure can enable a seamless integration of the present disclosure with existing systems.

According to some embodiments, the schema database comprises, for each message type, a schema having a predefined precision representation of the variables of the message type. Additionally, some embodiments of the present disclosure can update the schema database by changing the precision representation of at least part of the schemas of the schema database. By regularly adapting the precisions of the variables being used, accurate results of the application can be obtained.

For example, each schema of the schema database can be determined by modifying an existing message type (or schema). The modification of a message type can, for example, comprise reducing the number of variables of the message type, changing types of at least part of the variables of the message type and/or changing the order in which the variables are to be transmitted and/or processed. The selection from the schema database of a schema that corresponds to a given message type can be performed by mapping the message type to the schemas and identifying the schema that match the message type. A schema matches a message type if the schema and message type share at least a minimum number of variables and the difference between the number of variables of the schema and the message type is smaller than a predefined threshold. For example, the schema comprises n variables A1 to An and the message type comprises k variables B1 to Bk. The schema matches the message type if at least 80% of the variables of the schema are present in the message type and if the absolute value of the difference ($|n-k|$) is smaller than the threshold.

According to some embodiments, the schema database comprises, for each message type, a schema having different versions, wherein the selected schema is a most recent version of the schema or a user specified version of the schema. Using different versions can enable a flexible and multi-user environment. For example, this can enable different users to use different desired precisions for the variables used in the application.

According to some embodiments, the configuring of the serial interface is automatically performed in response to determining the types of messages and selecting the schemas. This can enable a systematic and uniform way of generating serialization and deserialization logics. For example, in case the hardware accelerator comprises a FPGA, bitstream files can automatically be generated for performing the configuring of the serial interface. The bitstream files can be used in one example to perform a partial reconfiguration of the FPGA. This can enable a focused adaptation of the behavior of the application at the FPGA e.g. the schema can be adapted while the application is running. In another example, the bitstream files can be used to perform a global reconfiguration of the FPGA e.g. the bitstream files can be used to reconfigure the whole FPGA.

According to some embodiments, the configuring of the serial interface comprises: generating at least one serialization function and deserialization function. The serialization function is configured to transform data of a message into a stream of binary data to be transmitted by the hardware accelerator. The deserialization function being configured for deserializing received stream of binary data at the hardware accelerator. The serialization and deserialization function can each be a logic. This generated logic can be built using, for example, a finite state machine (FSM), or by algorithmically parsing the selected schemas.

According to some embodiments, the hardware acceleration system further comprises a central processing unit (CPU) having one or more serial interfaces. The serial interfaces of the CPU can be defined (and thus configured) using software only. The method further comprises: repeating the method for the CPU, thereby configuring the serial interfaces of the CPU. For example, the type of messages to be exchanged with the CPU (messages to be sent or received by the CPU) in accordance with the application can be determined and corresponding schemas can be selected from the schema database before configuring the serial interfaces of the CPU using the selected schemas. The present disclosure can enable to configure the data messaging on software and/or hardware level.

According to some embodiments, the hardware acceleration system further comprises another hardware accelerator having one or more serial interfaces. The method further comprises: repeating the method for the other hardware accelerator, thereby configuring the serial interfaces of the other hardware accelerator. For example, the type of messages to be exchanged with the other hardware accelerator (messages to be sent or received by the other hardware accelerator) in accordance with the application can be determined and corresponding schemas can be selected from the schema database before configuring the serial interfaces of the other hardware accelerator using the selected schemas.

According to some embodiments, the serial interface of the hardware accelerator comprises a message generator and a serializer. The configuring comprises: configuring the message generator to generate a stream of message tokens of a message, and configuring the serializer to serialize the stream of message tokens into a stream of message units. Generating a stream of message tokens can be advantageous as it can save storage resources at the hardware accelerator in that the messages may not be processed at once but as a stream. The stream of message units can be a network phit stream.

The hardware acceleration system can also include a CPU that can be configured as described above. In this case, the configuring of the serial interface may not create a stream of message tokens (as there can be enough storage space on host computers). For example, the configuring of the serial interface can comprise serializing the message into a stream of message units and the deserialization is performed to deserialize a stream of message units into a whole message. Thus, the data structure exchanged between the serial interface and a user code of a CPU can be the whole message. In another example, the configuring of the serial interface of the CPU can be performed as described with the configuring of the serial interface of the hardware accelerator. This can simplify the configuration in that a same configuring approach is used for a heterogeneous acceleration system.

According to some embodiments, the method further comprises setting a size of each message token of the message tokens to n bits, wherein n is an integer that is smaller than a predefined maximum number of bits. For example, n can be equal to 1, 3, 5 or 8. This can enable to serve different bit-addressable devices. The size of the message token can be the smallest addressable unit in the hardware accelerator. This can enable to provide a hardware dependent solution.

According to some embodiments, the serial interface further comprises a deserializer. Further, configuring the serial interface can comprise configuring the deserializer for generating from a received stream of message units a stream of message tokens. The deserializer can be used in association with a serializer from which it receives the stream of message units. This can enable that the data structure exchange between the serial interface and a user logic of the hardware accelerator is a stream of message tokens.

The serialization and the deserialization logics can be generated by algorithmically parsing the selected schemas. The configuration of the serializer and the deserializer of a serial interface can comprise the generation of the serialization and the deserialization logics. In case of a serial interface of a CPU, a software compiler can be used to generate the serialization and the deserialization logics, e.g. protobuf compiler—protoc. In case of a serial interface of a hardware accelerator, such as a FPGAs, HLS tools can be used to generate the serialization and the deserialization logics. HLS tools can support various high-level languages, e.g. C/C++ to HDL or Python to HDL.

According to some embodiments, the hardware accelerator comprises a field programmable gate arrays, FPGA, an application-specific integrated circuit, ASIC, a neuromorphic device, or a bit-addressable device.

Using an FPGA can be advantageous. For example, using the present disclosure, a user can design a messaging system for a neural network (NN) application, that can offer the following advantageous features: a robust and efficient on field reconfiguration of the communication layer within a low timing budget (seconds versus hours/days), a support for any precision in contrast to GPUs and ASICs which support a datatype for performance targeted designs, e.g. FP16, INT8, binary, etc. and an adaptability to different NN architectures and/or model parameters. The hardware reconfiguration can be performed with low return-of-investment (ROI) risks.

According to some embodiments, the determining, selecting, and configuring, is performed at a design time of the hardware acceleration system. According to some embodiments, the method is performed as a field reconfiguration of the hardware acceleration system.

According to some embodiments, the application is an inference of a trained deep neural network (DNN).

The messaging system can enable a serializer/deserializer (SERDES) communication framework. SERDES frameworks can be custom implemented for an application, requiring long development and debug time. However, in case of a DNN application the precision and/or architecture can frequently change and thus the SERDES framework can need to be reimplemented. The present disclosure can provide an efficient SERDES framework that supports NN precision/architecture changes with a mitigated reconfiguration effort.

According to some embodiments, the schema database is stored in one of: on chip configuration memory of the hardware accelerator, on board FLASH of the hardware accelerator, on chip random access memory (RAM) of the hardware accelerator and a dynamic RAM (DRAM) of the hardware accelerator. The DRAM of the hardware accelerator can comprise an on-board DRAM and/or an in-package high bandwidth memory (HBM).

According to some embodiments, the messages are provided in an interface definition language (IDL) format.

FIG. 1 is a block diagram of a hardware acceleration system 100, in accordance with some embodiments of the present disclosure. The hardware acceleration system 100 can be a heterogeneous processing system. For example, the hardware acceleration system 100 can comprise different types of processing units such as CPU, FPGA, ASICs etc.

For simplification of the description, FIG. 1 shows a simplified configuration of a host computer 101 coupled to a hardware accelerator 102 that provides acceleration for processing data in comparison to processing data in software. However, it is not limited to that configuration and other configurations of the hardware acceleration system 100 can be used e.g. a configuration involving multiple hardware accelerators coupled to a host computer can be used or a configuration involving only hardware accelerators can be used.

The hardware accelerator 102 can be connected to the host computer 101 through a Peripheral Component Interconnect Express (PCIe) bus or Ethernet connection. The host computer 101 can be configured to execute initial boot procedures, basic Input/Output (I/O) functions, and so on. The hardware accelerator 102 has an accelerator architecture that is configured, with respect to the host computer architecture, for speeding up the execution of a particular class of computing functions. Such accelerated computing functions include, for example, vector processing and floating point operations.

The hardware acceleration system 100 can be configured to implement an application such as an inference of a trained neural network e.g. the hardware acceleration system 100 can be a FPGA based neural network accelerator system.

The host computer 101 and the hardware accelerator 102 are adapted to one another for message-based data communications. This data communication is done through a connection such as a PCIe bus or Ethernet connection. The hardware accelerator 102 can read input data from a global memory and perform the computation. The input data can be received via a network interface as a stream of network phits (the network interface can stream in and out fixed size data). The outputs can be written back to the global memory and can be sent as a stream of network phits via the network interface.

For example, the hardware accelerator 102 can comprise a FPGA and the host computer 101 can comprise a CPU. The CPU and the FPGA can be configured so as to execute or implement the application. The CPU can be coupled to a memory storing a compiled software application. The compiled software application includes function calls. The FPGA coupled to the CPU includes a compiled user function. The compiled user function can be executable in response to one of the function calls. The function call can comprise a message of variables that need to be processed by the user function.

FIG. 1 further comprises a messaging system 103 that is configured to perform at least part of the present disclosure. For example, the messaging system 103 can be configured for determining types of messages to be exchanged with the hardware accelerator 102 in accordance with the application. For each message type of the determined types of messages, a corresponding schema can be selected by the messaging system from a schema database. The serial interface of the hardware accelerator can be configured by the messaging system 103 in accordance with the selected schemas, to enable an exchange of messages having the determined types.

Figure 2:
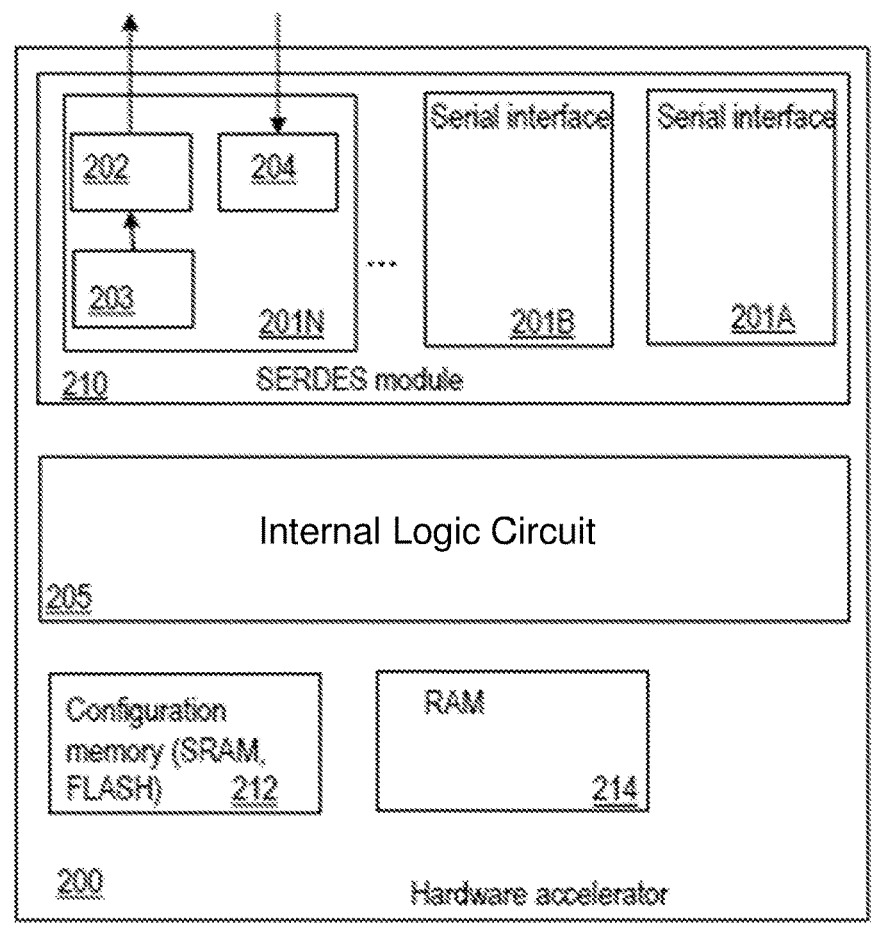
FIG. 2 is a block diagram of a hardware accelerator, in accordance with some embodiments of the present disclosure.

FIG. 2 depicts a block diagram of a hardware accelerator 200 such as a FPGA, in accordance with some embodiments of the present disclosure.

The hardware accelerator 200 can include a serializer/deserializer (SERDES) module 210. The SERDES module 210 can include, in accordance with embodiments of the present disclosure, multiple data channel blocks (or serial interfaces) 201A-N. As shown with data channel block 201N, each data channel block 201A-N can include a circuitry for both transmitting and receiving data. For transmitting data, the data channel block 201A-N serializes data such that the data can be transmitted at high speed. For receiving data, the data channel block 201A-N deserializes high speed serial data such that the message data can be reconstructed and used by a user logic e.g. 205 of the hardware accelerator 200. The data channel block 201A-N can comprise a message generator 203, a serializer 202 and a deserializer 204. The message generator 203 can be configured to generate a stream of message tokens of a message and provides the message tokens to the serializer 202. The serializer 202 can be configured to serialize the stream of the message tokens into a stream of message units. The deserializer 204 can be configured for generating from a received stream of message units a stream of message tokens.

The SERDES module 210 can be coupled to the internal logic circuit 205 of the hardware accelerator 200. The hardware accelerator 200 can further comprise other components. For example, the hardware accelerator 200 can comprise an on-chip configuration memory 212. The configuration memory 212 can be a static memory that can be changed with a bitstream reconfiguration. The hardware accelerator 200 can further comprise an on-chip RAM 214. The on-chip RAM can be a dynamic memory that can be changed at run time. The hardware accelerator 200 can further comprise (not shown) an on-board FLASH and on-board dynamic RAM (DRAM). The hardware accelerator 200 can further comprise an in-package HBM. The on-board FLASH can be a dynamic memory which can be changed at system boot time. The on-board DRAM can be a dynamic memory that can be changed at run time via a software loaded through a non-volatile device such as a solid state drive (SSD). The hardware accelerator 200 can further comprise other components such as resistors, capacitors, buffers and oscillators which have been omitted for clarity.

Figure 3:
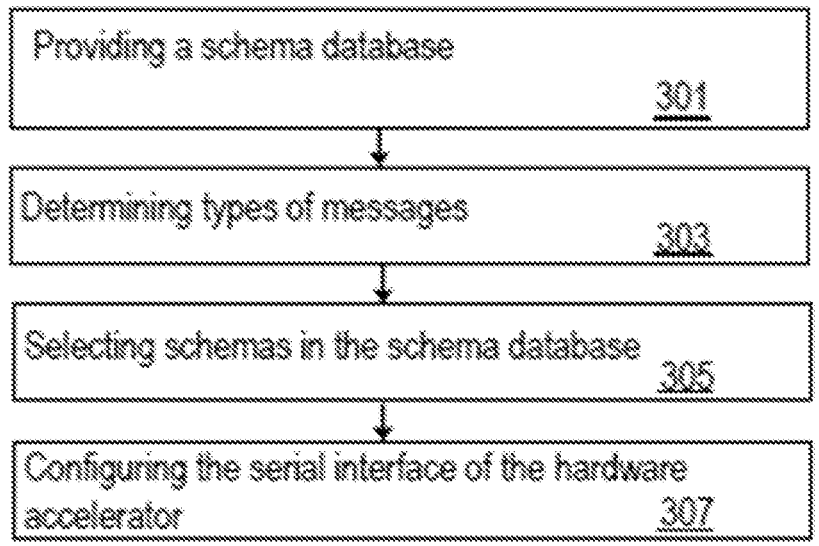
FIG. 3 is a flowchart of a method for an application of a hardware acceleration system, in accordance with some embodiments of the present disclosure.

FIG. 3 is a flowchart of a method for a hardware acceleration system comprising a hardware accelerator. The hardware acceleration system can be configured to perform or implement an application. For the purpose of explanation, the method can be implemented in the hardware acceleration system 100 illustrated in previous FIGS. 1-2, but is not limited to this implementation.

In step 301, a schema database can be provided. The schema database can comprise schemas in association with different message types. The type of a message indicates at least a number and type of variables of the message. The message type can be defined in an IDL file. The schema database can, for example, be stored in an on-chip storage of the hardware accelerator 200 or in an on-board storage of the hardware accelerator 200. In one example, the schema database can be stored in one of the configuration memory 212, the on-chip RAM 214, the on-board FLASH and/or the on-board DRAM. The schema database can provide a mapping between existing schemas (different types of messages) and new schemas as defined by the present disclosure. The schemas of the schema database can, for example, be controlled or managed by a software component.

Each schema of the schemas stored in the schema database can indicate a precision representation of variables of a message associated with the schema. For example, a schema can indicate the order of which the variables of a message are to be transmitted/processed and the type or precision representation of the variables. In case the hardware accelerator 200 is a FPGA, the schemas can be stored as bitstreams so that they can be reconfigured on field at runtime, e.g., through a reconfiguration controller in the FPGA (e.g., internet content adaptation protocol (ICAP)). In case the hardware accelerator 200 is an ASIC or neuromorphic device, the ASIC device can be configured once, at design-time of the hardware accelerator 200.

Types of messages to be exchanged with the hardware accelerator 102 in accordance with the application (e.g., NN application) can be determined in step 303. For example, the implementation of the application in the hardware acceleration system 100 can result in each of the processing units of the hardware acceleration system 100 being assigned a portion of code of the application to be performed by that processing unit. The execution of the application by the hardware acceleration system 100 can involve exchange of messages between the processing units (between the portions of codes of the processing units) of the hardware acceleration system 100. This can result in each processing unit of the hardware acceleration system 100 receiving and sending messages during execution of the application. For example, the hardware accelerator 102 can be configured to receive and transmit messages. Those to be received and to be transmitted messages can be identified and their types can be determined. For example, this can be performed by identifying in every portion of the code, the schema of messages exchanged with other portions of the code in a supported IDL e.g. protobuf, JSON, etc.

For example, a message can comprise variables of a neural network with different precisions. The variables can comprise weights, biases, input and output variables. The message can, for example, be as follows: MyMessage{int k=128; float x=4.5; half y=2.1; float X<5.2>m=1.2; bfloat n=19.7}. This message indicates the order of the variables, namely k, followed by x, which is followed by y, and so on. The message also indicates the type of variables.

For each message type of the determined types of messages, a corresponding schema can be selected in step 305. The selection can be performed using the schema database. For example, step 305 can comprise selecting the corresponding schema, of the message type, from the schema database.

For example, a given message type of the determined types of messages can be associated with multiple candidate schemas in the schema database. A schema (of the schema database) of the given message type can, for example, have been obtained by a modification of the given message type. For example, a first schema of the given message type can comprise a reduced number of variables and/or different types for at least part of the variables. A second schema of the given message type can comprise a different transmission/processing order of the variables and so on.

The selection can, for example, automatically be performed e.g. if more than one candidate schema of the schema database is associated with a message type, a random selection of one of the candidate schemas can be performed. If, in one example, a matching schema cannot be found/selected from the schema database for a given message type, the schema corresponding to the given message type can be generated (e.g., by a software component). The generated schema can, for example, comprise the same variables of the given message type. In another example, the generated schema can be obtained by modifying the given message type. The modification can be performed as described herein with the modifications performed in order to obtain schemas of the schema database.

In step 307, the serial interface of the hardware accelerator 200 can be configured in accordance with the selected schemas, to enable an exchange of messages having the determined types. For example, the message generator 203 can be configured to generate a stream of message tokens of a message, and the serializer 202 can be configured to serialize the stream of message tokens into a stream of message units that can be transmitted. The message token can have a user defined size e.g. 1 bit or 8 bits. The message unit can, for example, have a size of a network's phit in case the hardware accelerator is network attached e.g. the phit size is provided by a PHY. If the hardware accelerator needs to communicate the message units on-chip (without a network) with another hardware accelerator, a generic I/O can be used to communicate, based on a user-defined PHY definition. In this case, a designer can reprogram the message unit size on the hardware accelerator. The deserializer can be configured in step 307 for generating from a received stream of message units a stream of message tokens.

Figure 4:
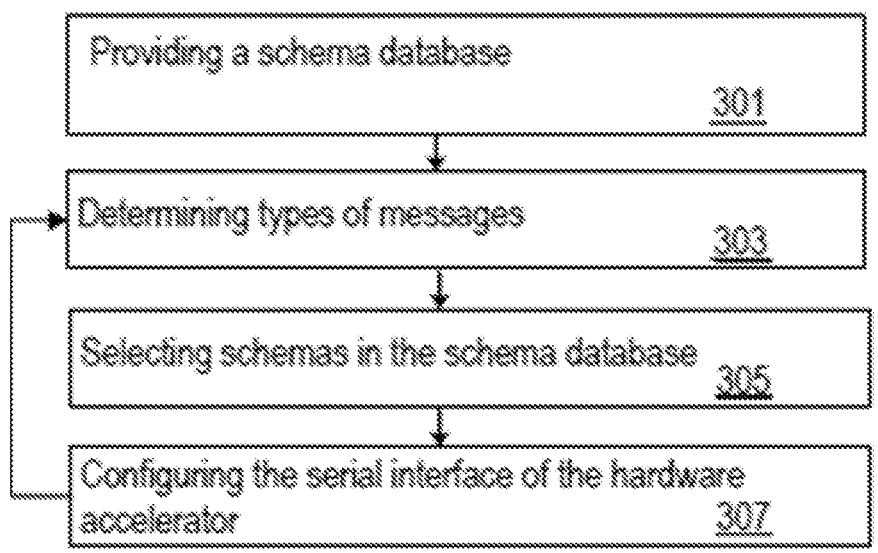
FIG. 4 is a flowchart of a method for an application of a hardware acceleration system, in accordance with some embodiments of the present disclosure.

FIG. 4 is a flowchart of a method for a hardware acceleration system comprising a hardware accelerator and another processing unit. The hardware acceleration system is configured to perform an application. The other processing unit can be a CPU or another hardware accelerator. The hardware accelerator and the other processing unit are configured to cooperate in order to perform the application. This cooperation can involve an exchange of messages by the hardware accelerator and the other processing unit. The method of FIG. 4 comprises all steps of FIG. 3 that configure the serial interface of the hardware accelerator. In addition, the method of FIG. 4 also configures the serial interface(s) of the other processing unit by repeating steps 303 to 307 for the other processing unit.

Figure 5:
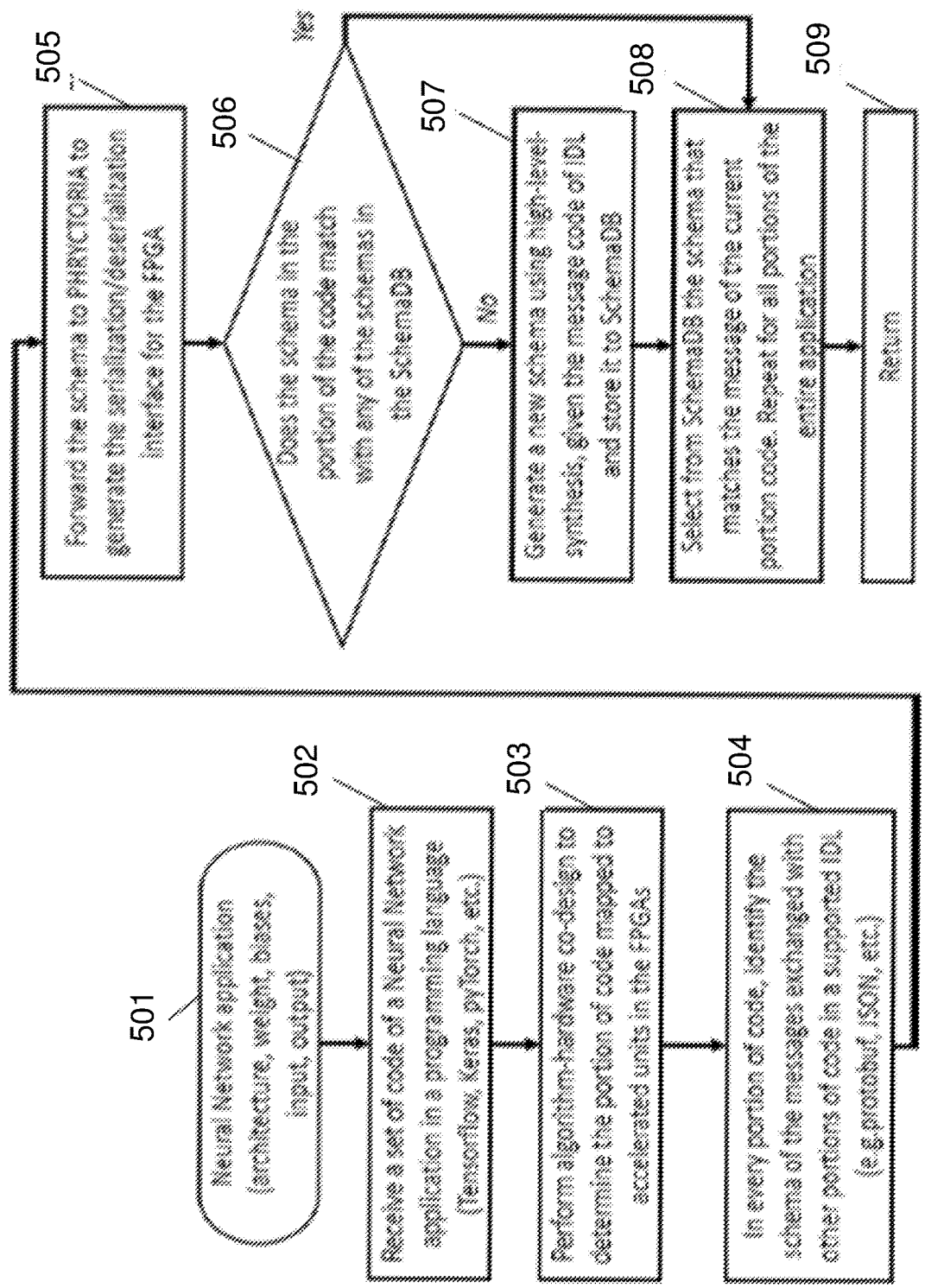
FIG. 5 is a flowchart of a method for an application of a hardware acceleration system, in accordance with some embodiments of the present disclosure.

FIG. 5 is a flowchart of a method for a hardware acceleration system. The hardware acceleration system can comprise multiple FPGAs.

A neural network application can be defined in step 501. For example, the architecture, weights, biases, inputs and outputs can be determined in step 501.

The code that implements the NN application can be received in step 502. The code can, for example, be in a programming language part of a program framework such as Tensorflow, Keras, or pyTorch.

An algorithm hardware co-design can be performed in step 503 to determine the portions of the code which are mapped to accelerated units in the FPGAs of the hardware acceleration system.

The schema of the messages exchanged in every portion of the code with other portions of the code which are in a supported IDL (e.g., protobuf, JSON) can be identified in step 504.

The identified schema can be forwarded in step 505 to a component of the messaging system e.g. named PHRYCTORIA, to generate the serialization/deserialization interface for the FPGA.

It can be determined (inquiry step 506) by PHRYCTORIA if the identified schema in the portion of the code matches with any of the schemas in the schema database. If not, a new schema can be generated in step 507 using high level synthesis, given the message code of IDL and store it in the schema database.

The schema that matches the message of the current portion code can be selected from the schema database in step 508. The method steps 504-508 can be performed for all code portions of the NN application. After processing all code portions, a return step 509 can be performed. The return step can, for example, provide or return results (e.g. the selected schemas) of steps 501-508.

Figure 6:
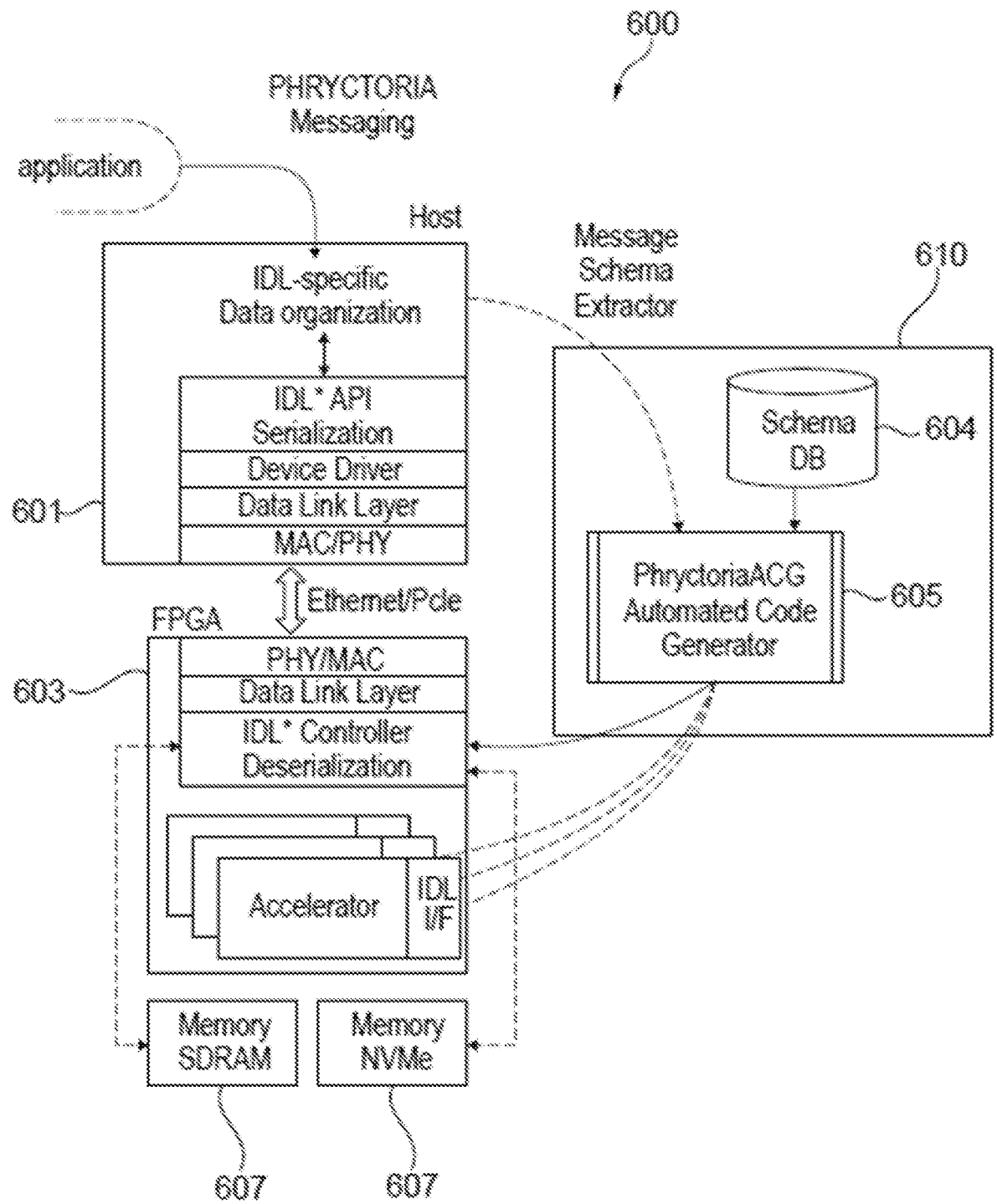
FIG. 6 is a block diagram of a hardware acceleration system, in accordance with some embodiments of the present disclosure.

FIG. 6 is a block diagram of a hardware acceleration system 600, in accordance with some embodiments of the present disclosure. The hardware acceleration system 600 comprises a host software 601 and a FPGA 603. The hardware acceleration system 600 further comprises messaging system 610. The messaging system 610 can comprise a schema database 604 and a component 605 named PHRYCTORIA. In another example, the schema database 604 may not be part of the messaging system 610 e.g. the messaging system 610 can be configured to access the schema database 604 at the FPGA 603. FIG. 6 shows the implementation of a transmission stack of layers in the host software 601 and the implementation of a reception stack of layers in the FPGA 603. The transmission stack includes a serializer layer and the reception stack includes a deserializer layer. The routines used in the serializer and deserializer layers can be determined or generated by the PHRYCTORIA component 605 (e.g. as described with steps 305 and 307) using the schema database 604. The FPGA 603 can be configured to use a memory (e.g. on-board memory) 607 to read input data e.g. received from the host software 601.

Given a desired configuration of the hardware acceleration system and data pertaining to a distributed application code to be processed via the hardware acceleration system in said configuration, the PHRYCTORIA can identify a set of arbitrary data representations of messages, called schemas, exchanged between different portions of the code as an interface description language, or IDL, supported by the FPGA and the CPU. Based on the identified set of schemas, the PHRYCTORIA can generate the code of a messaging framework (such as a SERDES communication framework) interpretable by vendor specific design tools (such as implementation or synthesis tools) to configure the FPGA and the CPU. The identified communication framework can be integrated in the FPGA and CPU for them to accordingly process distributed application code.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A messaging method for a hardware acceleration system, the method comprising:
   determining a plurality of exchange message types to be exchanged with a hardware accelerator in accordance with an application performed by the hardware acceleration system, wherein the plurality of exchange message types indicates a number of variables, and a type of the variables, of a plurality of messages corresponding to the plurality of exchange message types;
   selecting a plurality of schemas from a schema database comprising a plurality of message type schemas corresponding to a plurality of potential message types, wherein:
      the plurality of message type schemas indicates a precision representation of variables of messages associated with a schema of the plurality of schemas;
      the schema database comprises, for each of the plurality of exchange message types, a schema having different versions; and
      the selected plurality of schemas corresponds to the determined plurality of exchange message types;
   updating the schema database by changing at least one precision representation value of the schema database during a usage of the hardware acceleration system; and
   configuring a serial interface of the hardware accelerator in accordance with the selected plurality of schemas, to enable a message exchange comprising the plurality of messages.

2. The method of claim 1, wherein the selected plurality of schemas comprises a most recent version of one of the selected plurality of schemas.

3. The method of claim 1, wherein the selected plurality of schemas comprises a user specified version of one of the selected plurality of schemas.

4. The method of claim 1, wherein configuring the serial interface is automatically performed in response to determining the plurality of exchange message types and selecting the plurality of schemas.

5. The method of claim 1, wherein configuring the serial interface comprises generating at least one serialization function and deserialization function, wherein:
   the serialization function transforms data of a first message of the determined plurality of exchange message types into a transmitted stream of binary data that the hardware accelerator transmits; and
   the deserialization function deserializes a received stream of binary data of a second message of the determined plurality of exchange message types at the hardware accelerator.

6. The method of claim 1, wherein:
   the hardware acceleration system comprises a central processing unit (CPU) comprising one or more CPU serial interfaces;
   determining the plurality of CPU exchange message types comprises determining the plurality of exchange message types to exchange with the CPU in accordance with the application;
   selecting a plurality of CPU schemas from the schema database corresponding to the determined plurality of CPU exchange message types; and
   configuring the CPU serial interfaces, in accordance with the selected plurality of CPU schemas, to enable a CPU message exchange.

7. The method of claim 1, wherein:
   the hardware acceleration system comprises an additional hardware accelerator comprising one or more additional serial interfaces;
   determining the plurality of additional exchange message types comprises determining a subset of the plurality of exchange message types to exchange with the additional hardware accelerator in accordance with the application;
   selecting a plurality of additional schemas from the schema database corresponding to the determined plurality of additional exchange message types; and
   configuring the additional serial interfaces, in accordance with the selected plurality of additional schemas, to enable an additional message exchange.

8. The method of claim 1, wherein:
   the serial interface of the hardware accelerator comprises a message generator and a serializer; and
   configuring the serial interface comprises:
      configuring the message generator to generate a stream of message tokens of a message of the determined plurality of exchange message types; and
      configuring the serializer to serialize the stream of message tokens into a stream of message units.

9. The method of claim 8, further comprising setting a size of a message token to n bits, wherein n is an integer smaller than a predefined maximum number of bits.

10. The method of claim 8, wherein:
    the serial interface comprises a deserializer; and
    configuring the serial interface comprises configuring the deserializer to generate the stream of message tokens from a received stream of message units of a message of the determined types.

11. The method of claim 1, wherein the hardware accelerator comprises one selected from a group consisting of: a field programmable gate array (FPGA) an application-specific integrated circuit (ASIC) a neuromorphic device, and a bit-addressable device.

12. The method of claim 1, wherein determining the plurality of exchange message types, selecting the plurality of schemas, and configuring the serial interface are performed at a design time of the hardware acceleration system.

13. The method of claim 1, wherein determining the plurality of exchange message types, selecting the plurality of schemas, and configuring the serial interface are performed as a field reconfiguration of the hardware acceleration system.

14. The method of claim 1, wherein the application comprises an inference of a trained deep neural network (DNN).

15. The method of claim 1, wherein the schema database is stored on one selected from the group consisting of: on-chip configuration memory of the hardware accelerator, on-board FLASH of the hardware accelerator, on-chip random access memory (RAM) of the hardware accelerator, and in-package high bandwidth memory (HBM) and on-board dynamic RAM (DRAM) of the hardware accelerator.

16. The method of claim 1, wherein a plurality of messages associated with the plurality of determined exchange message types are represented using an interface definition language (IDL) format.

17. A computer program product comprising program instructions stored on a computer readable storage medium, the program instructions executable by a processor to cause the processor to perform a method comprising:
- determining a plurality of exchange message types to be exchanged with a hardware accelerator in accordance with an application performed by a hardware acceleration system, wherein the plurality of exchange message types indicates a number of variables, and a type of the variables, of a plurality of messages corresponding to the plurality of exchange message types;
- selecting a plurality of schemas from a schema database comprising a plurality of message type schemas corresponding to a plurality of potential message types, wherein:
  - the plurality of message type schemas indicates a precision representation of variables of messages associated with a schema of the plurality of schemas;
  - the schema database comprises, for each of the plurality of exchange message types, a schema having different versions; and
  - the selected plurality of schemas corresponds to the determined plurality of exchange message types;
- updating the schema database by changing at least one precision representation value of the schema database during a usage of the hardware acceleration system; and
- configuring a serial interface of the hardware accelerator in accordance with the selected plurality of schemas, to enable a message exchange comprising the plurality of messages.

18. The computer program product of claim 17, wherein:
the serial interface of the hardware accelerator comprises:
- a message generator;
- a serializer; and
- a deserializer; and configuring the serial interface comprises:
- configuring the message generator to generate a stream of message tokens of a message of the determined plurality of exchange message types;
- configuring the serializer to serialize the stream of message tokens into a stream of message units; and
- configuring the serial interface comprises configuring the deserializer to generate the stream of message tokens from a received stream of message units of a message of the determined types.

19. A system comprising:
a memory comprising instructions; and
a processor configured to execute the instructions to perform a method comprising:
- determining a plurality of exchange message types to be exchanged with a hardware accelerator in accordance with an application performed by a hardware acceleration system, wherein the plurality of exchange message types indicates a number of variables, and a type of the variables, of a plurality of messages corresponding to the plurality of exchange message types;
- selecting a plurality of schemas from a schema database comprising a plurality of message type schemas corresponding to a plurality of potential message types, wherein:
  - the plurality of message type schemas indicates a precision representation of variables of messages associated with a schema of the plurality of schemas;
  - the schema database comprises, for each of the plurality of exchange message types, a schema having different versions; and
  - the selected plurality of schemas corresponds to the determined plurality of exchange message types;
- updating the schema database by changing at least one precision representation value of the schema database during a usage of the hardware acceleration system; and
- configuring a serial interface of the hardware accelerator in accordance with the selected plurality of schemas, to enable a message exchange comprising the plurality of messages.

* * * * *